US011216858B2

(12) United States Patent
Mindich et al.

(10) Patent No.: US 11,216,858 B2
(45) Date of Patent: Jan. 4, 2022

(54) SYSTEM AND METHOD FOR ELECTRONICALLY SHARING AND PURCHASING MEMORABILIA AND MERCHANDISE WITH REAL-TIME SOCIAL NETWORKING FEATURES

(71) Applicants: Brad Mindich, Needham, MA (US); Guy Elsmore-Paddock, Woburn, MA (US)

(72) Inventors: Brad Mindich, Needham, MA (US); Guy Elsmore-Paddock, Woburn, MA (US)

(73) Assignee: Inveniem, LLC, Woburn, MA (US)

( * ) Notice: Subject to any disclaimer, the term of this patent is extended or adjusted under 35 U.S.C. 154(b) by 892 days.

(21) Appl. No.: 15/218,551

(22) Filed: Jul. 25, 2016

(65) Prior Publication Data

US 2017/0024793 A1  Jan. 26, 2017

Related U.S. Application Data

(60) Provisional application No. 62/196,644, filed on Jul. 24, 2015.

(51) Int. Cl.
*G06Q 30/00* (2012.01)
*G06Q 30/06* (2012.01)
(Continued)

(52) U.S. Cl.
CPC ..... *G06Q 30/0625* (2013.01); *G06Q 30/0282* (2013.01); *G06Q 50/01* (2013.01)

(58) Field of Classification Search
CPC . G06Q 30/0625; G06Q 30/0282; G06Q 50/01
See application file for complete search history.

(56) References Cited

U.S. PATENT DOCUMENTS

| 6,904,410 | B1 * | 6/2005 | Weiss | G06Q 10/087 |
| | | | | 705/26.61 |
| 9,396,356 | B2 * | 7/2016 | Pereira | G06F 21/645 |

(Continued)

OTHER PUBLICATIONS

Definition of "merchandise" at https://www.merriam-webster.com/dictionary/merchandise?src=search-dict-hed. Accessed by the Examiner on Sep. 25, 2020 (Year: 2020).*

(Continued)

*Primary Examiner* — Anne M Georgalas
(74) *Attorney, Agent, or Firm* — McCarter & English, LLP

(57) ABSTRACT

A system and method for electronically sharing and purchasing memorabilia and merchandise with real-time social networking features are provided. The system allows users to access, via a web-based platform, items of memorabilia and/or merchandise, to exchange and share information relating to such items, and to purchase such items. The system also includes a real-time comment platform which integrates with third-party social networking platforms (e.g., Twitter, Facebook, etc.), and automatically publishes comments from the platform of the system to such third-party systems. Additionally, the system automatically generates comment identifiers (e.g., hashtags, etc.) that are specific to an item of memorabilia/merchandise, and automatically publishes the identifiers to one or more of the third-party social networking platforms. Still further, the system automatically, in real time, gathers comments posted on such external systems and integrates same into comments posted on the system.

30 Claims, 15 Drawing Sheets

(51) Int. Cl.
*G06Q 30/02* (2012.01)
*G06Q 50/00* (2012.01)

(56) References Cited

U.S. PATENT DOCUMENTS

| | | | |
|---|---|---|---|
| 10,425,783 B1* | 9/2019 | Caldwell | H04L 51/046 |
| 2005/0055625 A1* | 3/2005 | Kloss | G06Q 10/10 |
| | | | 715/205 |
| 2008/0082578 A1* | 4/2008 | Hogue | G06F 3/0482 |
| 2008/0235591 A1* | 9/2008 | Krantz | G06F 3/033 |
| | | | 715/730 |
| 2010/0199340 A1* | 8/2010 | Jonas | G06Q 10/10 |
| | | | 726/8 |
| 2011/0191406 A1* | 8/2011 | Plunkett | G06F 15/16 |
| | | | 709/203 |
| 2013/0091029 A1* | 4/2013 | George | G06Q 20/12 |
| | | | 705/21 |
| 2014/0207612 A1* | 7/2014 | Isaacson | G06Q 30/0635 |
| | | | 705/26.8 |
| 2015/0134371 A1* | 5/2015 | Shivakumar | G06Q 10/02 |
| | | | 705/5 |
| 2015/0195314 A1* | 7/2015 | Reed | G06Q 50/01 |
| | | | 709/204 |

OTHER PUBLICATIONS

Definition of "memorabilia" at https://www.merriam-webster.com/dictionary/memorabilia. Accessed by the Examiner on Sep. 25, 2020. (Year: 2020).*

"What Will the Future of Death on the Internet Look Like?" by Seamus Condron, PCMag.com, Nov. 26, 2013, accessed on Jul. 30, 2021, at https://www.pcmag.com/opinions/what-will-the-future-of-death-on-the-internet-look-like (Year: 2013).*

* cited by examiner

1982     ORIGINAL SIGNALS ALBUM PHOTO

SPECIAL PROMOTION ▼

[BACK TO STORE]

Receive a free digital download of Rush's Signals album for you and 3 friends when you purchase this artifact
LEARN MORE

DESCRIPTION
This is the original photo taken for Rush's album Signals.
HISTORY
The year is 1982 and Rush is about to release one of their most successful records of all time, Signals. The album is a continuation of Rush's foray into the technology-oriented 1980's with increased use of electronic instrumentation such as keyboards, sequencers, and the electric violin. The album reached #10 on the Billboard album charts and was certified platinum.

ONLY ONE IN CIRCULATION

● ○ ○

ORIGIN
*The photo was taken by Claudius Lewis in Monn Heights, Quebec*
CIRCA
*September 1982*
QUANTITY
*1 in circulation*

$1,799.99

[ADD TO CART]

[SHARE THIS]

1. ENTER MAILING ADDRESS

Name

Country ⌄

Street Address

City

ZIP Code

☐ THIS IS A GIFT

Have a promo code? Enter it Here

[          ] SUBMIT

ORDER TOTAL
$1,179.98
Digital download will become availble after purchase.

SUBMIT ORDER

2. ENTER BILLING DETAILS

Choose Payment Method ⌄

BILLING ADDRESS
☐ SAME AS SHIPPING ADDRESS

Name on Card

Country ⌄

Street Address

City

ZIP Code

3. CONFIRM ORDER

| Original Signals Album Photo | $449.99 |
| Original Signals Album with Production Notes | $599.99 |
| TAX | $100.00 |
| SHIPPING | $20.00 |

CHOOSE YOUR SHIPPING OPTION

| [CHOOSE] UPS Ground / Ground Delivery | $0.00 | [CHOOSE] UPS Next Day Air / Next day Air | $69.05 |

CHOOSE YOUR SHIPPING OPTION

| [CHOOSE] UPS Ground / Ground Delivery | $0.00 | [CHOOSE] UPS Next Day Air / Next day Air | $69.05 |

REVIEW YOUR ORDER

| PRODUCT | PRICE | QUANTITY | TOTAL |
|---|---|---|---|
| Original Signals Album Photo | $449.99 | 1 | $449.99 |
| Original Signals Album with Production Notes | $599.99 | 1 | $599.99 |
| | | SUBTOTAL | $1,049.98 |
| | | TAX | +$100.00 |
| | | UPS GROUND | +$0.00 |
| | | ORDER TOTAL | $1,149.98 |

BILLING INFORMATION
John Smith
123 Sesame Street
Hollywood, CA 12345

PAYMENT OPTIONS
○ Example payment
○ [Paypal]
⦿ Swipe

Card owner
[            ]

Card number
[            ]

Expiration
[01 ▾] / [15 ▾]

Security code
[    ]

FIG. 8G — 180

SYSTEM AND METHOD FOR ELECTRONICALLY SHARING AND PURCHASING MEMORABILIA AND MERCHANDISE WITH REAL-TIME SOCIAL NETWORKING FEATURES

CROSS-REFERENCE TO RELATED APPLICATION

This application claims priority to U.S. Provisional Patent Application No. 62/196,644 filed on Jul. 24, 2015, which is incorporated herein by reference in its entirety and made a part hereof.

BACKGROUND

Technical Field

The present disclosure relates to online systems for memorabilia and merchandise exchange and purchasing. More particularly, the present disclosure relates to a system and method for sharing and purchasing memorabilia and merchandise with real-time social networking features.

Related Art

There are various systems in the art for allowing individuals to sell and purchase goods and services, including items of memorabilia. As is well-known, eBay provides an online platform where users can purchase goods which often include items of memorabilia, such as memorabilia relating to musical bands, etc. Additionally, web-based systems exist wherein users can exchange information (e.g., comments, blogs, etc.) relating to particular artists. Still further, social networking systems, such as Twitter, Facebook, etc., are all well-known platforms for allowing users to post comments relating to various topics.

A particular drawback of existing systems is the inability for users to quickly and conveniently locate desired items of memorabilia or merchandise from a particular time period associated with an artist. For example, it can be hard for a user to find memorabilia relating to a particular band's album from a particular year, as the user must often use generic search engines (e.g., Google) to locate relevant information. Often, the user has to sort through irrelevant information. Still further, existing systems do not provide rich online comment platforms that are particularly targeted to specific items of memorabilia and/or merchandise for a particular artist, nor do such systems adequately interface with third-party social networking platforms. Accordingly, what would be desirable is a system which addresses the foregoing needs.

SUMMARY

The present disclosure relates to a system and method for electronically sharing and purchasing memorabilia and merchandise with real-time social networking features. The system allows users to access, via a web-based platform, items of memorabilia and/or merchandise (e.g., relating to a musical artist), to exchange and share information relating to such items (including comments relating to such items), and to purchase such items. The system also includes a real-time comment platform which integrates with third-party social networking platforms (e.g., Twitter, Facebook, etc.), and automatically publishes comments from the platform of the system to such third-party systems. Additionally, the system automatically generates comment identifiers (e.g., hashtags, etc.) that are specific to an item of memorabilia/merchandise, and automatically publishes the identifiers to one or more of the third-party social networking platforms, thereby extending a comment thread on the platform of the system to one or more external systems. Still further, the system automatically, in real time, gathers comments posted on such external systems (and relating to items of interest) and integrates same into comments posted on the system.

BRIEF DESCRIPTION OF THE DRAWINGS

The foregoing features of the invention will be apparent from the following Detailed Description, taken in connection with the accompanying drawings, in which:

FIGS. 8A-8J are screen shots illustrating various aspects of a web-based user interface generated by the system.

DETAILED DESCRIPTION

The present disclosure relates to a system and method for electronically sharing and purchasing memorabilia and merchandise with real-time social networking features, as discussed in detail below in connection with FIGS. 1-8J.

Figure 1:
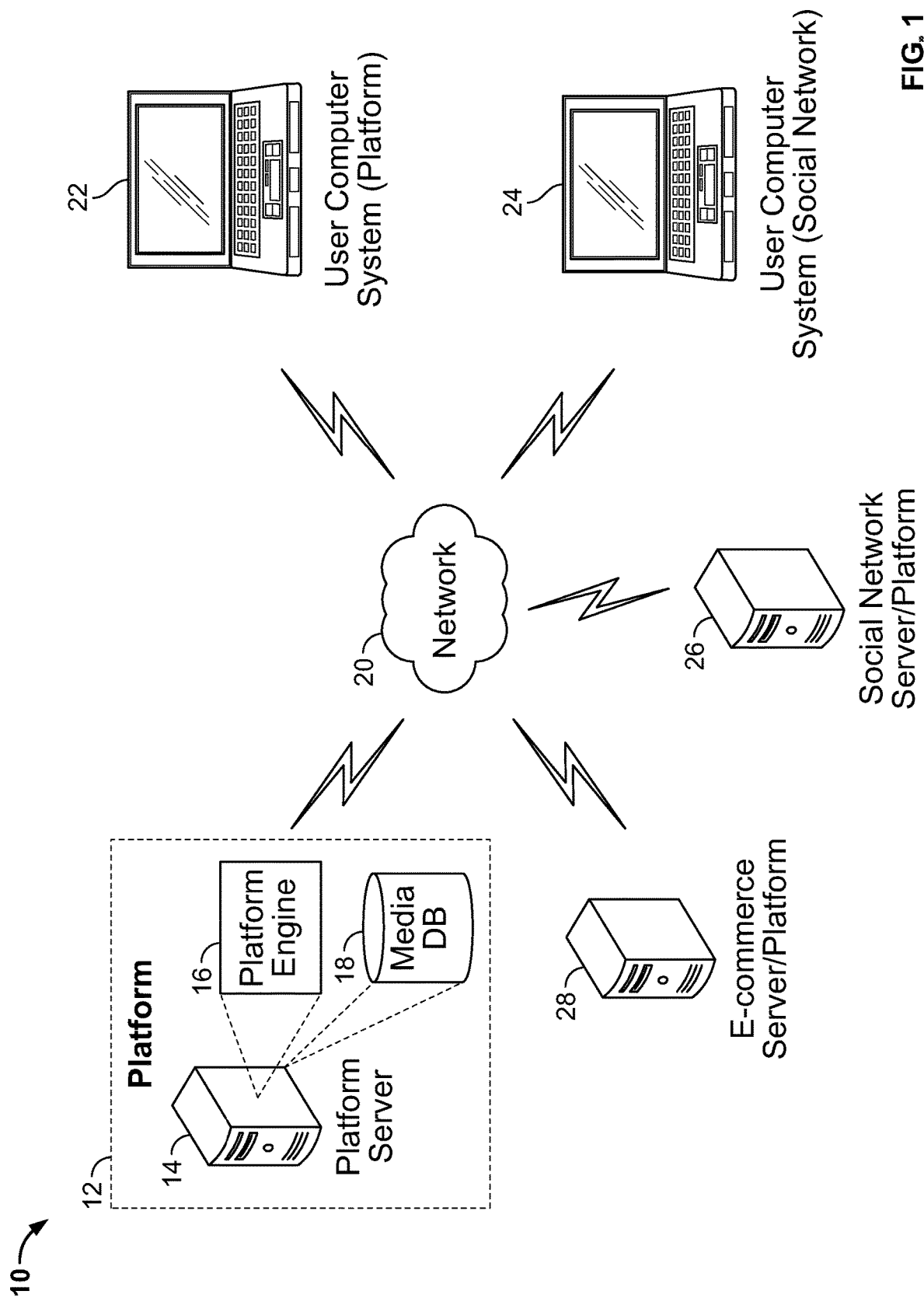
FIG. 1 is a diagram illustrating hardware and software components of the system of the present disclosure.

FIG. 1 is a diagram illustrating hardware and software components of the system of the present disclosure, indicated generally at 10. The system 10 includes a web-based platform 12 that provides a web-based user interface for allowing users to share and purchase memorabilia and merchandise of various types, including, but not limited to, musical band memorabilia and merchandise. As will be discussed in greater detail below, the platform also provides an online comment feature that allows users to post comments relating to merchandise, memorabilia, memories of events (e.g., favorite concerts), albums, etc. Additionally, the platform communicates with third-party social networks, automatically creates and publishes to the third-party social networks topic identifiers (e.g., "hashtags") relating to memorabilia or merchandise on the platform, and integrates, in real time, comments posted on such networks into comment threads hosted by the platform. Moreover, the platform 12 generates an electronic timeline navigation screen interface that allows users to quickly and conveniently access memorabilia, merchandise, and comments by selecting a desired year in the timeline.

The platform 12 includes a platform server 14 which stores and executes a platform engine 16, and a content (media) database 18. The server 14 could be a cloud-based computing platform, a stand-alone server, a collection of servers, or other suitable computing hardware that is specially-programmed in accordance with the present disclosure to provide the services/features discussed herein. Such special programming is embodied as the engine/module 16, which includes custom-written software modules which generate the web-based platform features discussed herein. The content database 18 stores multimedia information relating to memorabilia and merchandise, such as images of same. The platform 12 is accessible by a user computer system 22 via a network 20, such as the Internet, a wired network, a wireless network, etc. The computer system 22 could be a mobile computing device such as a smartphone or tablet computer, a laptop computer, a personal computer, etc. Additionally, a user of a third-party social networking service (e.g., Twitter, Facebook, etc.) can access the platform using computer system 26. The platform 12 also communicates with a third-party social networking computer system (platform) 26, such as Twitter or Facebook. As discussed in greater detail below, the platform 12 automatically generates an identifier (e.g., hashtag) relating to a piece of memorabilia or merchandise available on the platform 12, automatically transmits the identifier to the third-party social networking computer system 26 (e.g., one or more servers operated by Twitter, Facebook, etc.), and automatically retrieves, in real time, any comments made by users of the third-party social networking platform, and integrates those comments into online comments moderated by the platform 12 and made available to users of the platform 12. Still further, the platform 12 communicates with an e-commerce server/platform 28, which electronically processes purchases of memorabilia/merchandise selected using the platform 12. The platform 28 could include one or more available e-commerce platforms, such as ShipStation, etc. It is noted that the platform 12 could also be used to store, share, and allow users to purchase selected multimedia items such as music files, video files, albums, videos, images, etc., if desired.

Figure 2:
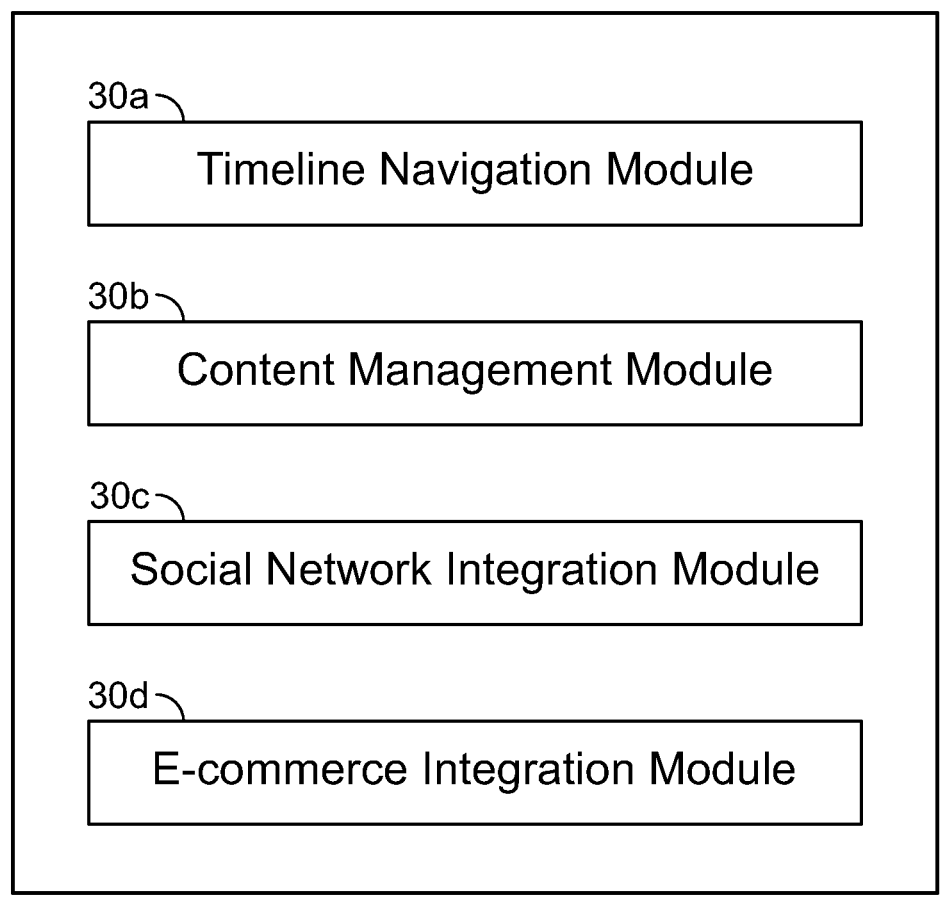
FIGS. 2-3 are diagrams illustrating software components of the system, in greater detail.
Figure 3:
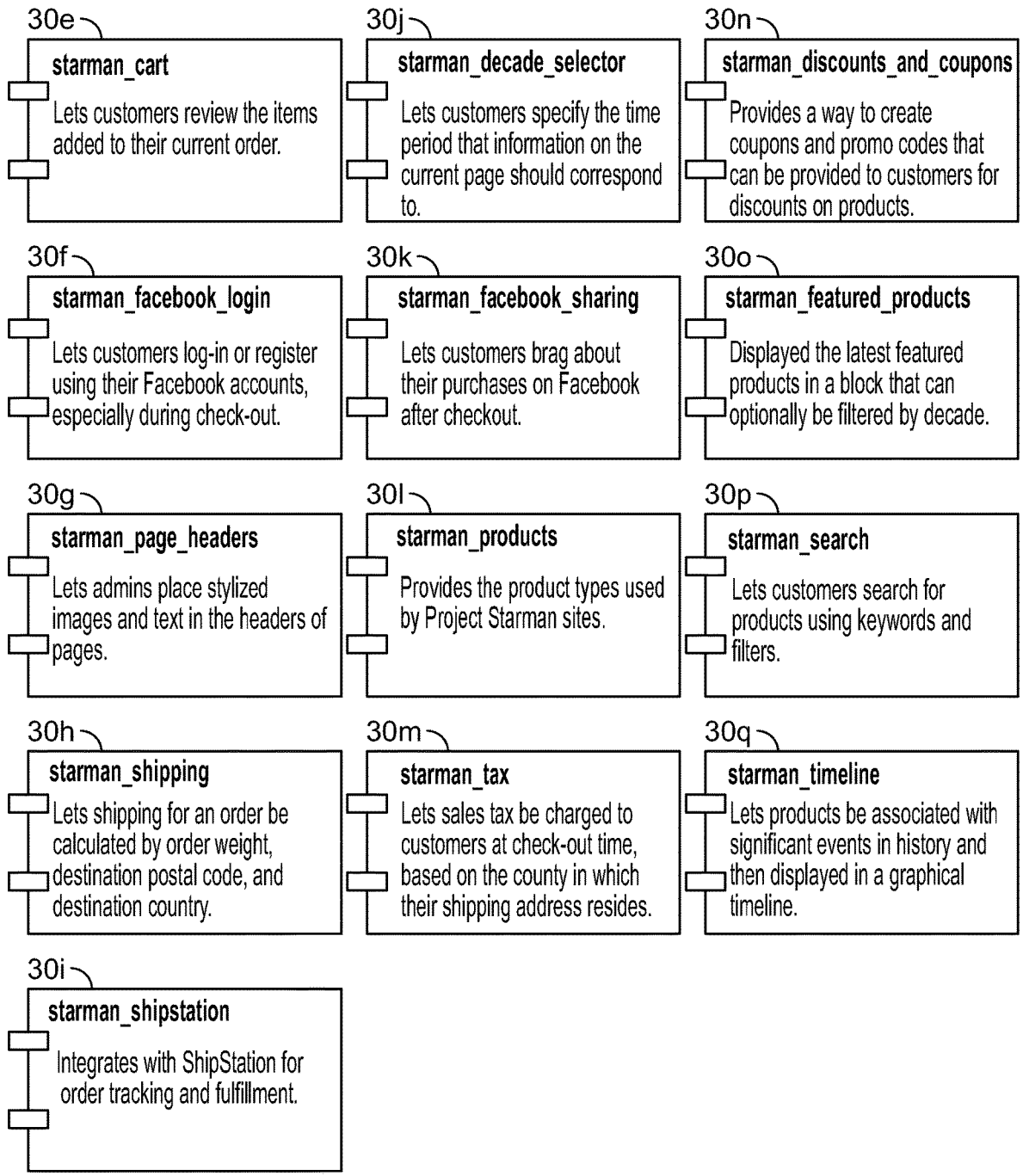

FIGS. 2-3 are diagrams illustrating software components of the system, in greater detail. Referring to FIG. 2, the engine 16 includes a plurality of modules 30a-30d which provide various functions/services in accordance with the present disclosure, including a timeline navigation module 30a, a content management module 30b, a social network integration module 30c, and an e-commerce integration module 30d. The timeline navigation module 30a generates an electronic timeline (shown in FIG. 8B and discussed in greater detail below) that allows a user to quickly and conveniently locate desired memorabilia, merchandise, comments, history, and/or other information relating to a musical band by selecting a year in the electronic timeline. When a desired year has been selected, the module 30a polls the content database 18 to obtain content relating to merchandise, memorabilia, history, and/or other information stored in the database 18 and relevant to the specified year. The module 30a then formats this information and presents it to the user. The timeline generated by the module 30a can be dynamically generated based on available merchandise and/or memorabilia, such that the timeline generated by the module 30a could expand or contract based on the number of years associated with merchandise and/or memorabilia.

The content management module 30b accepts incoming content relating to memorabilia, merchandise, history, etc., and stores this information in the database 18. It is also responsible for maintaining the database 18, handling queries from the module 30a, etc. The social network integration module 30c coordinates communication between the platform 12 and one or more third-party social network computer systems/platforms 26 (FIG. 1), such as Twitter, Facebook, etc. This functionality is described in greater detail in connection with FIGS. 6-7, below. The e-commerce integration module 30d coordinates electronic purchases of merchandise and memorabilia available on the platform 12, and communicates with one or more e-commerce systems/platforms 28 (FIG. 1) to complete electronic sales transactions relating to such purchases.

Referring to FIG. 3, additional modules 30e-30q of the engine 16 are illustrated. These additional modules include a shopping cart module 30e which allows users to add/remove/modify/view items to be purchased, a Facebook login module 30f which allows users to log-in or register with the platform 12 using the user's existing Facebook account (if the user has such an account), particularly when checking out of a sales transaction on the platform 12, a page headers module 30g which allows system administrators to place stylized images and text in the headers of web pages generated by the platform 12, and a shipping module 30h which allows users to calculate shipping for an order according to weight, destination postal code, and destination country, an e-commerce tracking/fulfillment module 30i which provides order tracking and fulfillment functions.

Additional modules provided in the engine 16 include a decade selector module 30j which allows customers to specify a time period (e.g., year) to which information on the current web page should correspond, a Facebook sharing module 30k which allows customers to communicate information about memorabilia/merchandise available from the platform 12 on a Facebook account, a product type module 30l which provides information about product types available on the platform 12, and a tax module 30m which calculates sales tax and allows such tax to be charged to customers of the platform 12 at check-out time, based on the country specified in the shipping address.

Still further, the engine 16 includes a discount and coupon module 30n which allows users to create coupons and promotion codes that can be provided to customers of the platform 12, for various uses (such as in connection with obtaining discounts on products available on the platform 12), a featured products module 30o which displays the latest featured products (e.g., in a block that can optionally be filtered by decade), a search module 30p which allows customers to search for products using keywords and filters, and a timeline association module 30q which associates products with significant events in history and depicted in a graphical timeline.

Figure 4:
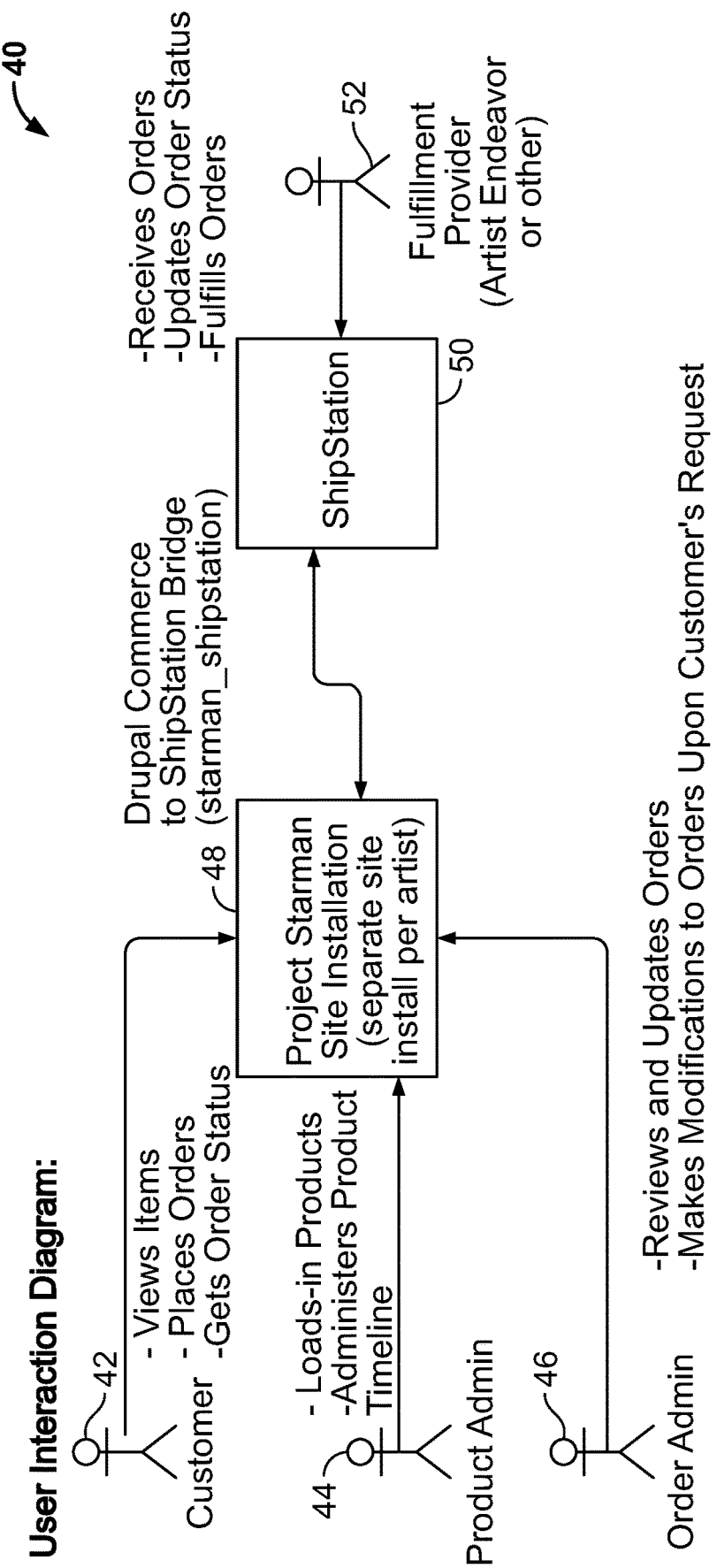
FIG. 4 is a user interaction diagram illustrating operation of the system.

FIG. 4 is a user interaction diagram illustrating operation of the system, indicated generally at 40. Various users of the system, such as a customer 42, a product administrator 44, and/or an administrator 46 can interact with a "site installation" 48, which is a particular instantiation of the platform 12 for a given customer (such as an artist, a band, a celebrity, etc.). For example, the customer 42 can view items available on the system (e.g., memorabilia, merchandise, etc.), place orders, and obtain order status. The product administrator 44 can define and upload products (e.g., create descriptions of selected memorabilia/merchandise, upload images/videos/audio files related to products, etc.), and can administer the product timeline. The administrator 46 can review and update orders, make modifications to orders upon customers' requests, and perform other administrative functions. The site installation 48 communicates product orders with a third-party e-commerce platform (corresponding to the platform 28 shown in FIG. 1), such as the ShipStation platform 50. The platform 50 receives orders, updates order status, fulfills orders, and performs other functions. A fulfillment provider 52 can interact with the platform 50, and could correspond to an artist, artist endeavor, or another entity.

Figure 5:
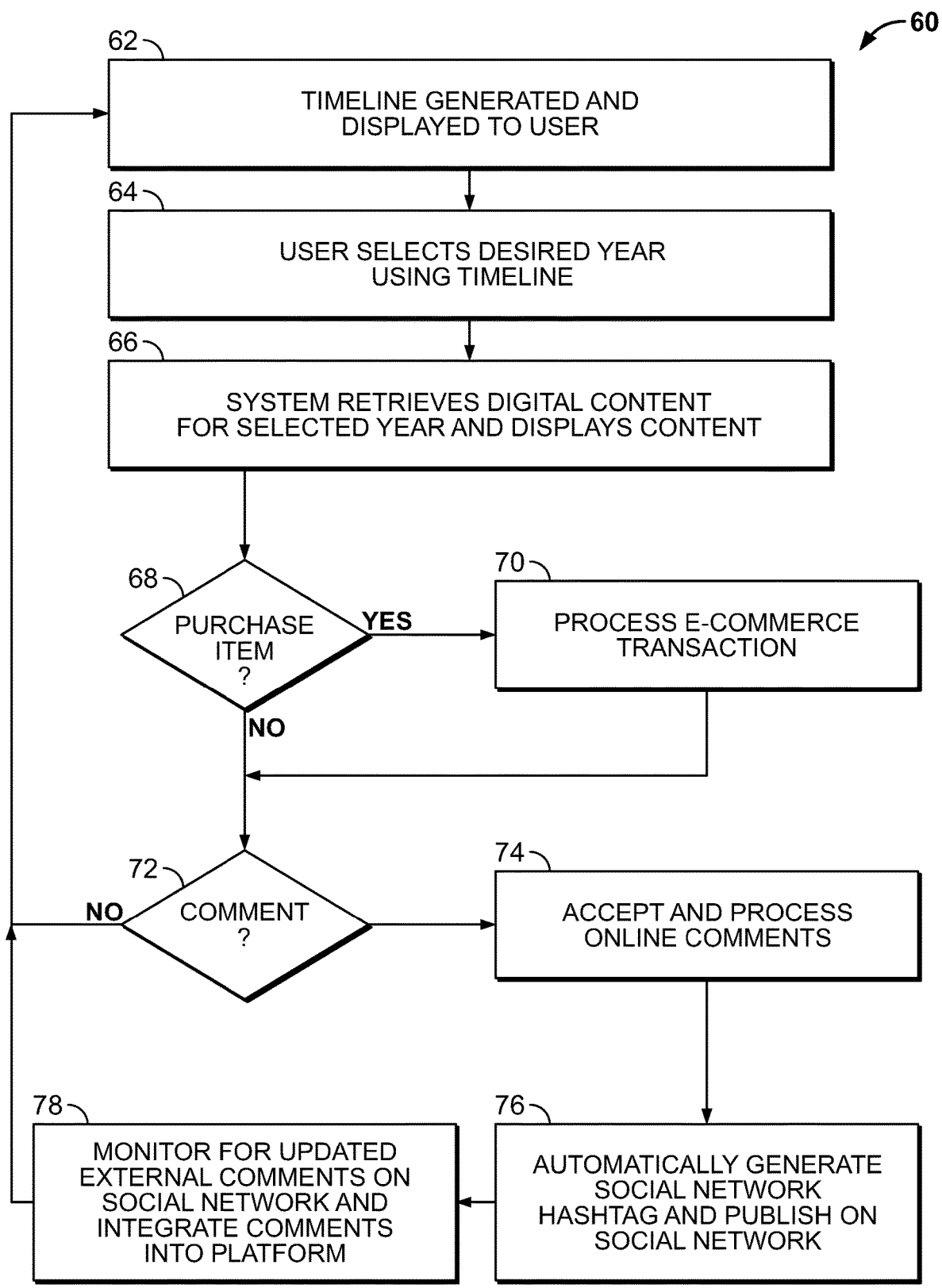
FIG. 5 is a flowchart illustrating processing steps carried out by the system.

FIG. 5 is a flowchart illustrating processing steps carried out by the system, indicated generally to 60. Beginning in step 62, the system generates and displays a timeline to the user. As will be discussed in greater detail in connection with FIG. 8B below, the timeline is an electronic screen component that allows a user to scroll through the timeline and selected a desired time period (e.g., a desired year). In step 64, the user selects the desired time period (e.g., year) using the timeline. Then, in step 66, the system retrieves digital content from the database 18 corresponding to the selected year, and displays the content. As will be discussed in greater detail below, the content could correspond to memorabilia and/or merchandise relating to a band, an artist, a celebrity, etc. In step 68, a determination is made by the system as to whether the user desires to purchase one or more items of memorabilia and/or merchandise displayed by the system. If a positive determination is made, step 70 occurs, wherein the system processes an e-commerce transaction to allow the user to purchase the product. As discussed above, such a process could be carried out by the third-party e-commerce server/platform 28 of FIG. 1 operating in conjunction with the platform 12.

If a negative determination is made in step 68, step 72 occurs, wherein a determination is made by the system whether the user desires to engage in commentary relating to a particular product (e.g., a particular item of memorabilia and/or merchandise), an artist, a band, an event, etc. For example, a user may wish to post comments about a poster available for sale on the system, commenting on the fact that the user previously attended an event being shown in the poster (such as a concert), favorite memories from the event, etc. If a negative determination is made, control returns to step 62. Otherwise, step 74 occurs, wherein the system accepts and processes such comments. As will be described below, the platform 12 generates and hosts (curates) its own comment feature, allowing users of the system to engage in online commentary. Additionally, in step 76, the platform 12 automatically generates a social network identifier (e.g., hashtag) relating to a particular comment topic (e.g., a hashtag relating to a particular piece of memorabilia, merchandise, event, etc.) and publishes the identifier on a social network (e.g., Twitter, Facebook, etc.). By doing so, the system automatically extends the online comment capability of the platform 12 to third-party social networks, and allows users who may not yet be registered with the platform 12 to engage in comments relating to the topic. Finally, in step 78, the platform 12 automatically monitors, in real time, for updated external comments (e.g., from a Facebook or Twitter account) relating to the published identifier, and automatically downloads ("pulls") such comments into the online commentary hosted by the platform 12. By doing so, the commentary posted on such external social networks is automatically integrated into commentary on the platform 12.

Figure 6:
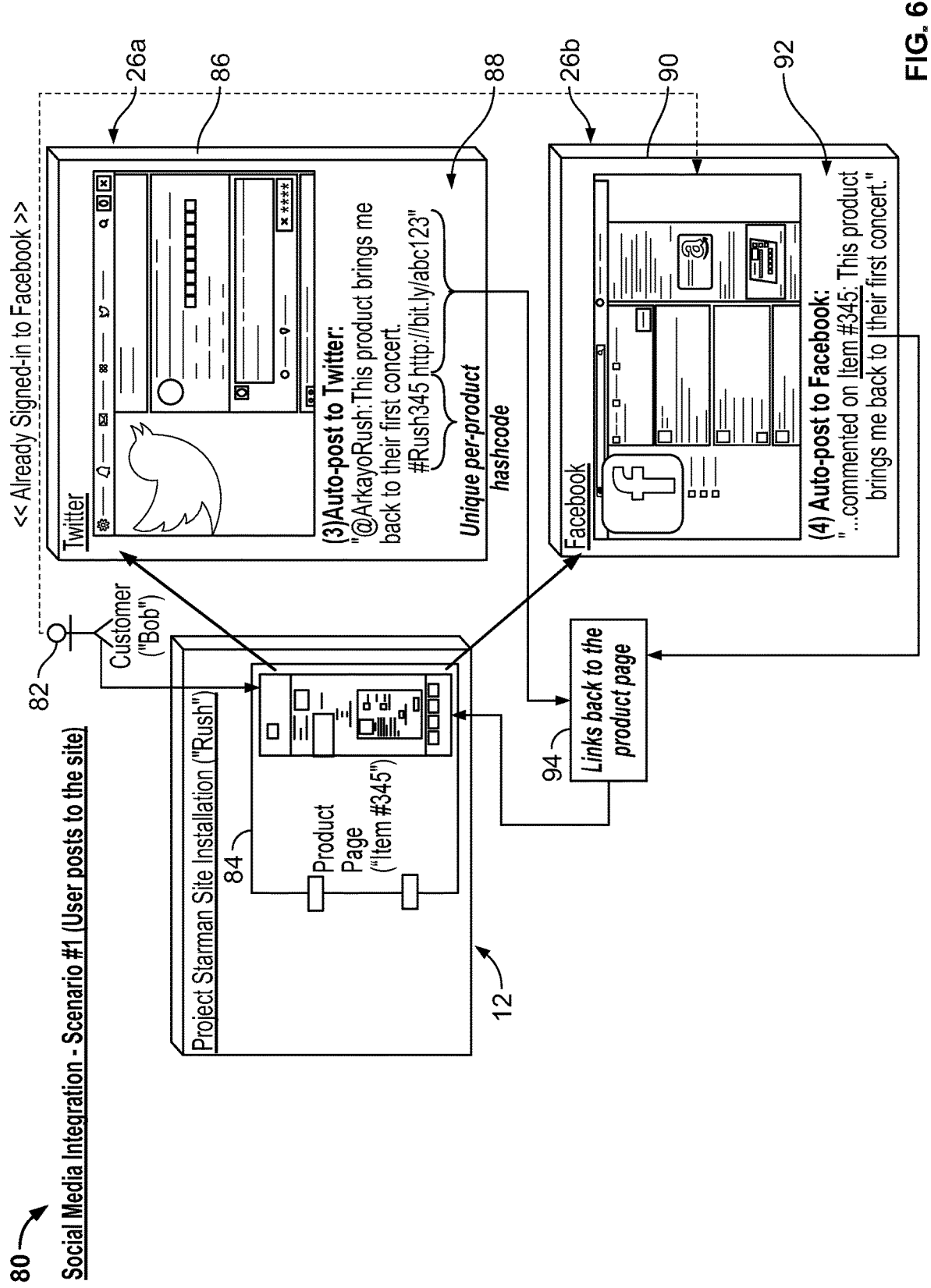
FIGS. 6-7 are flow diagrams illustrating integration of the system and operation with one or more third-party social network platforms.
Figure 7:
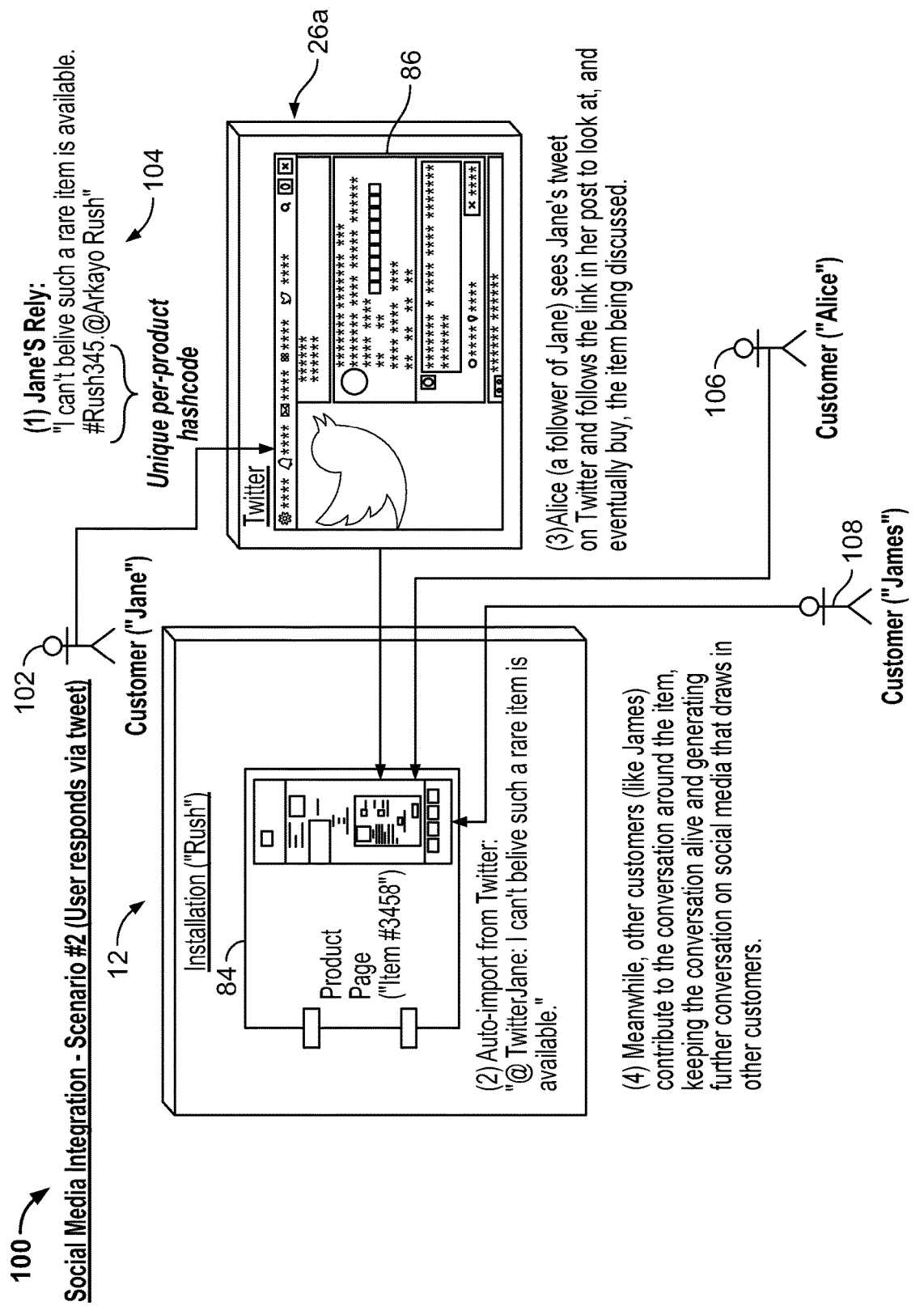

FIGS. 6-7 are flow diagrams illustrating integration of the system and operation with one or more third-party social network platforms. Referring to the flow diagram 80 shown in FIG. 6, illustrated is a first interaction scenario illustrating interaction between the platform 12 and two third-party social media systems/platforms 26a, 26b (in this case, Twitter platform 26a and Facebook platform 26b). As illustrated, the platform 12 generates a web page 84 providing information about a particular product (e.g., an item of memorabilia), which allows users of the platform (e.g., customer (82)) to comment on the product using online comment features of the web page 84. An on-going, on-site discussion occurs on the platform 12 involving customer 82, which has previously signed into the platform 12 (e.g., using customer 82's Facebook account credentials). Customer 82 enters a comment on the platform 12 using the web page 84 ("This product brings me back to their first concert."). The platform 12 automatically generates an identifier 88, which is a unique, per-product hashcode, and automatically posts the identifier to a comment page 86 on the Twitter platform 26a. The identifier 88 includes a hypertext link which is automatically inserted into the identifier 88 by the platform, and provides a link to the page 84 relating to the product. Also, as shown, the platform 12 automatically generates and publishes another identifier 92 to a comment page 90 on the Facebook platform 26b. As with the identifier 88, the identifier 92 includes a hypertext link embedded in the identifier 88 which links back to the web page 84. The links provided by the identifiers 88 and 92 on the platforms 26a, 26b link back to the platform 12 as illustrated by box 94. Moreover, the platform 12 continuously monitors, in real time, for comments added to the external (third-party) comment pages 86 and 90, and automatically retrieves comments added to those pages to the comments on the page 84, thus "synchronizing" commentary relating to the product across all of the platforms 12, 26a, and 26b. Thus, when a user comments on one of the platforms, the comments are viewable across all platforms.

Referring to the flow diagram 100 of FIG. 7, an alternate scenario is presented in accordance with the system of the present disclosure for integrating third-party social networking features. As shown, a user 102 (customer "Jane"), who does not have an account with the platform 12 but does have an account with the Twitter platform 26a, posts a comment on the comment page 86 relating to a product (Item #345) on the platform 84. The platform 12 previously (prior to Jane's comment) automatically generated an identifier 104 relating to the product (Item 345) and posted the identifier on the page 86. As with the example in FIG. 6, the identifier 104 is a unique, per-product hash code which includes an embedded hypertext link to the page 84 of the platform (relating to the product 145). Jane's comment on the page 86 is automatically imported by the platform 12 and displayed in the comment section of the page 84, thus automatically integrating, in real time, Jane's comment into the platform (even though Jane is not a user of the platform 12). A follower of Jane's comment on page 86 (such as customers 106 and 108) can access both Jane's comment on the platform 26a and the page 84 relating to the product (Item 345) on the platform 12. For example, customer 106 ("Alice" who is a follower of Jane) sees Jane's tweet on Twitter, and follows the link to her post, views the post, and eventually buys the item being discussed, using the platform 12. Meanwhile, another customer 108 ("James") contributes to the comments on the page 84 of the platform 12, keeping the conversation going and generating further conversation on social media that draws in other customers.

In connection with flow diagrams 80 and 100, a user can also upload their own photos or videos in addition to commenting or in lieu of commenting. For example, if a user has a Facebook account and a photograph on their timeline relating to a product on the platform 12, the user can add the photograph to their comments relating to the product on the platform 12. This expansion of user generated content beyond just comments allows for greater interactivity between users and more opportunity for users to engage with the items on the platform 12. The user can upload the photo or video from anywhere using any type of device and any type of social media or networking platform.

FIGS. 8A-8J are screen shots illustrating various aspects of a web-based user interface generated by the system. Each will now be described.

Figure 8A:
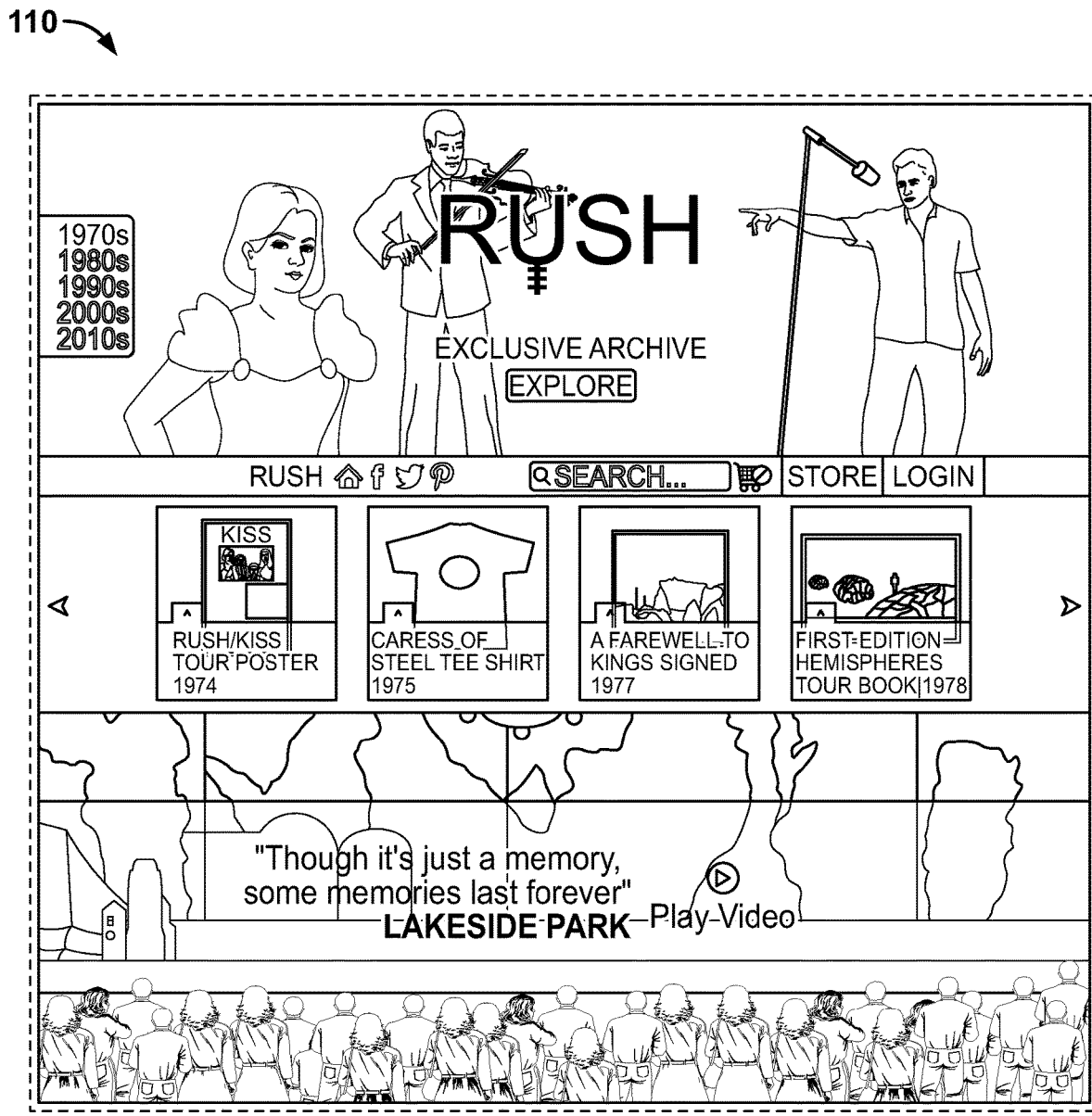

As shown in FIG. 8A, the system generates a home or "landing" page 110. As can be seen the page 110 is customized for a particular artist, in this case the rock music band RUSH. From the landing page 110, the user can access an archive of merchandise, memorabilia, commentary, history, and other information relating to the band. The user can conduct a text search for specific topics, play video and/or audio files relating to the band, and/or access information relating to a particular time period (year) or album using the system.

Figure 8B:
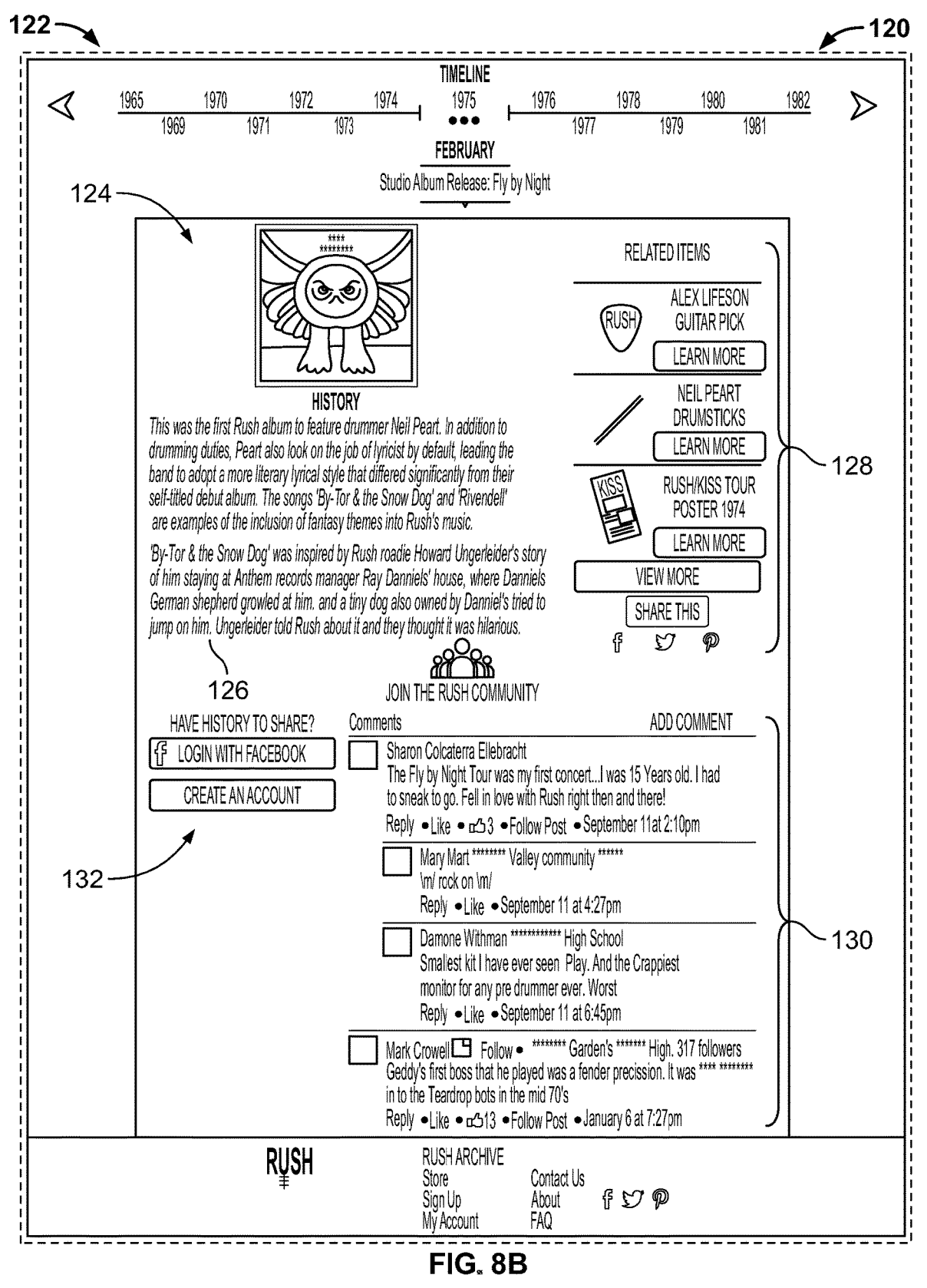

As shown in FIG. 8B, the system can generate a product-specific page 120 which provides information relating to a particular piece of memorabilia and/or merchandise. The page 120 includes an electronic timeline 122 which can be utilized by the user to select a desired time period (as shown in FIG. 8B, the year 1975). A display region 124 displays information relating to the year 1975 (in this case, information about the album FLY BY NIGHT by the band RUSH, which was released in 1975). A "history" display region 126 provides information about the item displayed in region 124 (in this case, historical information about the album FLY BY NIGHT). A "related items" display region 128 is also displayed in the page, and provides information about related products/memorabilia/merchandise, such as guitar picks, drumsticks, tour posters, etc., all related to the album displayed in region 124. Additionally, the page 120 includes a comment region 130, wherein the user can engage in live comment exchange with other users (of both the system 12 and third-party social networking systems described above, such as platforms 26a, 26b of FIGS. 6 and 7). Additionally, links 132 are provided for allowing access to third-party social network accounts (e.g., Twitter and Facebook accounts).

Figure 8D:
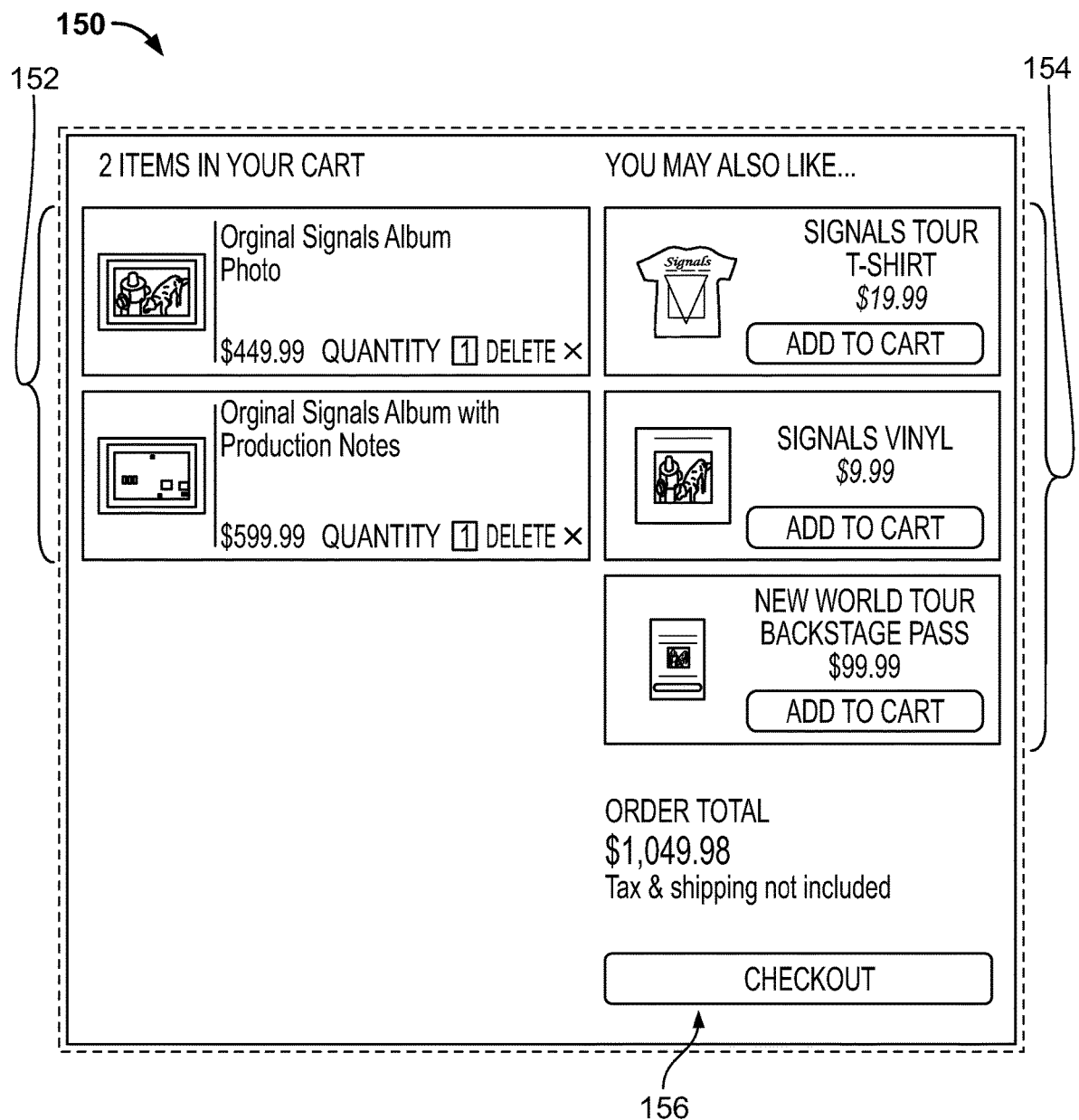

As shown in FIG. 8C, a product purchase page 140 can be generated by the system, allowing a user to purchase a particular piece of memorabilia (in this case, an original photo relating to a band's album). As shown in FIG. 8D, a shopping cart page 150 can be generated by the system, allowing the use to view items 152 that have been selected for purchase, and to view additional suggested items 154 that the user may wish to purchase. When the user is ready, the user can initiate purchase of selected items by clicking on the "Checkout" button 156. As shown in FIG. 8E, an order confirmation page 160 can be generated by the system, which allows the user to specify a mailing address, a billing address, and confirm an order. Additionally, the page 160 allows the user to submit a promotional code, if one is available. As shown in FIG. 8F, the system also provides controls 170 for allowing the user to specify shipping methods. Further, as shown in FIG. 8G, the user can review and confirm his/her order using a page 180.

Figure 8H:
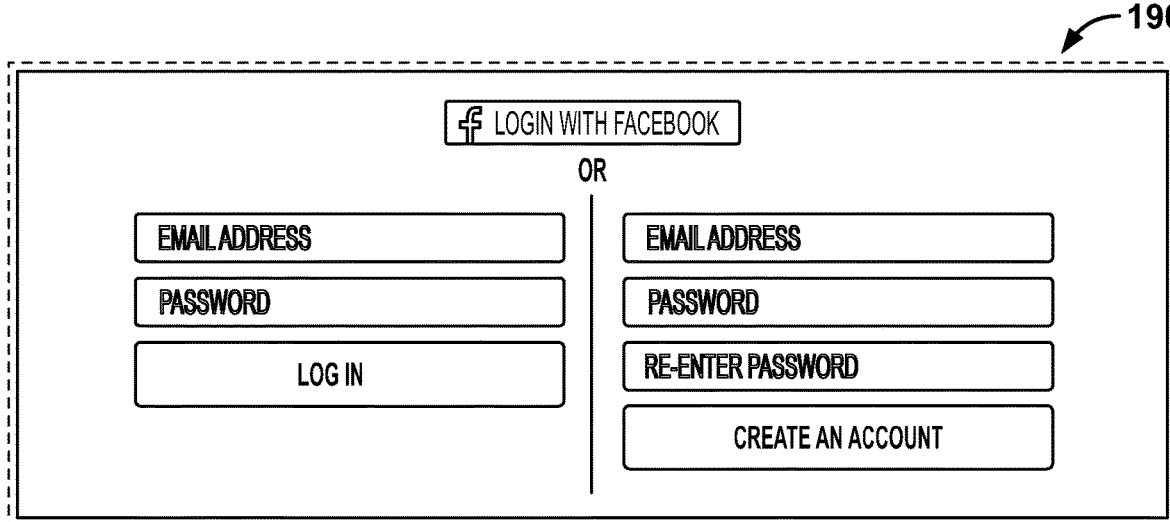
Figure 8I:
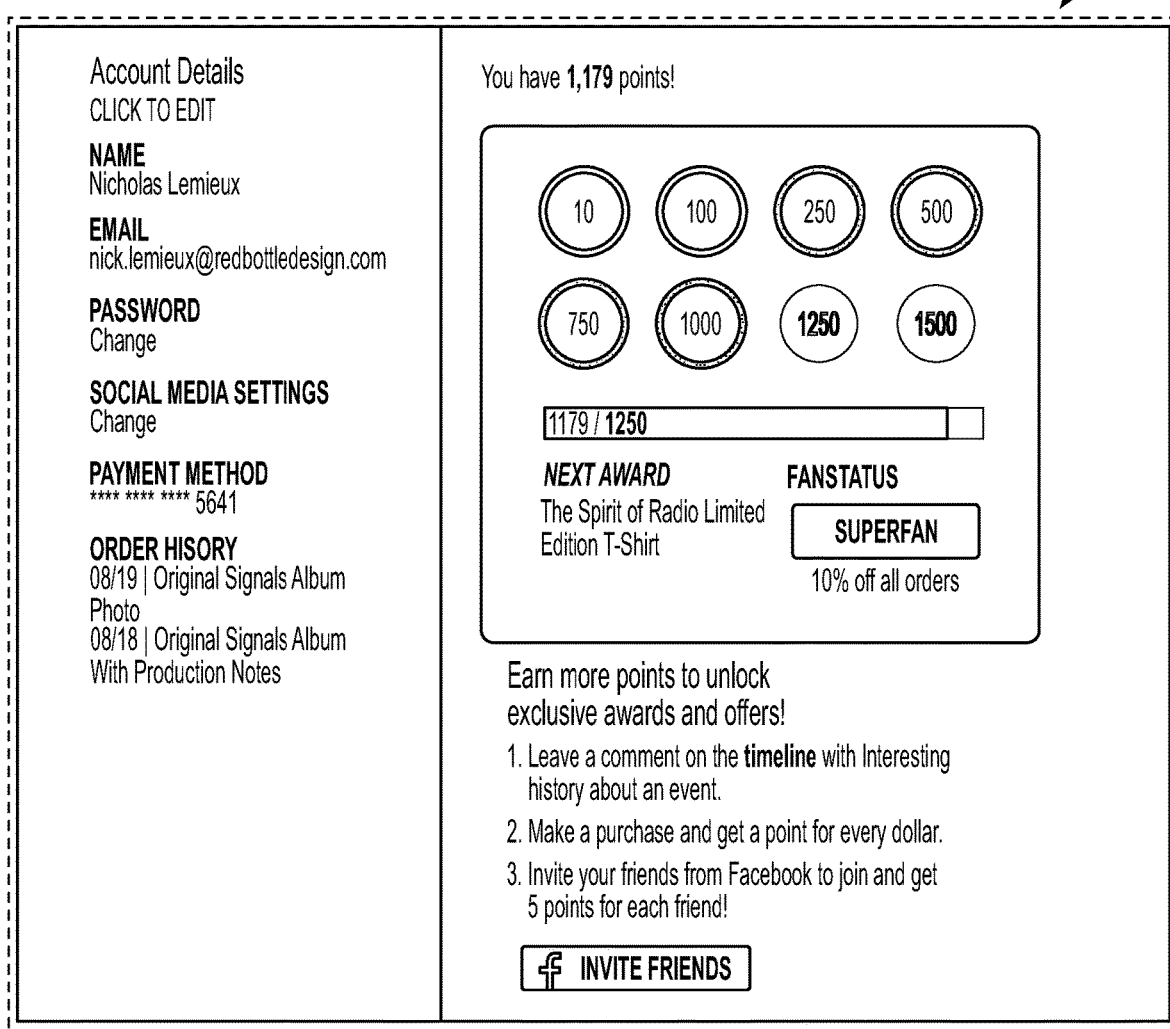

As shown in FIG. 8H, a page 190 is provided by the system for logging into the system, using either a specific account name and password for the system, or using an existing account and password for a third-party social networking platform (such as Facebook). Additionally, the page 190 allows the user to create an account. As shown in FIG. 8I, the system can generate a page 200 which provides details about the user's account, including information about points that the user may have (which could be accrued and used to obtain an award, such as a free item of memorabilia/merchandise). It is noted that a user could accumulate points and use such points to gain access on the system to additional experiences, special content, etc. Moreover it is noted that the system could generate custom codes for users, which could be used to access special areas of the platform, if desired.

Figure 8J:
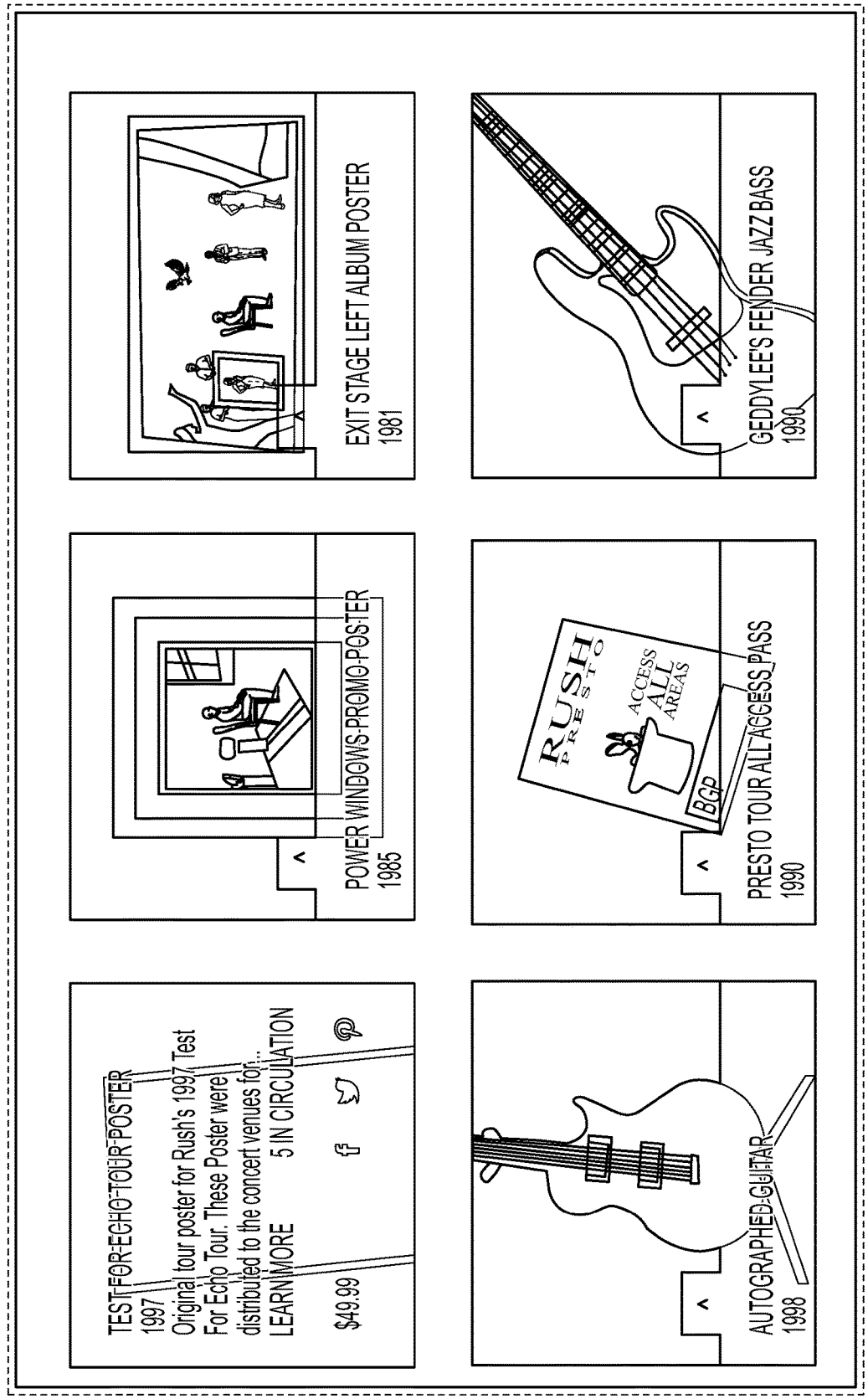

Finally, as shown in FIG. 8J, the system could allow a user to navigate to specific items of interest using page 210, which allows the user to directly access items of memorabilia/merchandise. Thus, using the page 210, the user need not access desired merchandise/memorabilia using the timeline discussed herein.

Although the discussion herein has focused on items of memorabilia/merchandise in connection with musical bands, it is to be understood that the system of the present disclosure is not limited to such types of items. Indeed, the system could be utilized in connection with various other types of items, in various fields.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure. What is desired to be protected by Letters Patent is set forth in the following claims.

What is claimed is:

1. A system for electronically sharing and purchasing memorabilia and merchandise comprising:
a web-based platform that provides a web-based user interface for allowing users to share and purchase memorabilia, the web-based platform including a platform server for storing and executing a platform engine and a content media database; and
at least one computer system for allowing a user to access the web-based platform, the computer system including a processor and a memory,
wherein the web-based platform automatically generates a hashtag relating to a piece of memorabilia or merchandise available on the web-based platform, automatically transmits the hashtag to a third-party social networking platform, and automatically retrieves, in real-time, any comments made by users of the third-party social networking platform and integrates the comments into other comments moderated by the web-based platform.

2. The system of claim 1, wherein the platform engine comprises a timeline navigation module for generating an electronic timeline that allows a user to locate desired memorabilia or merchandise.

3. The system of claim 2, wherein the electronic timeline is dynamically generated based on available merchandise or memorabilia such that the timeline generated is capable of expanding or contracting based on the number of years associated with the memorabilia or merchandise.

4. The system of claim 1, further comprising an e-commerce platform for electronically processing purchases of memorabilia or merchandise selected using the web-based platform.

5. The system of claim 1, wherein the web-based platform is configured to avow users to perform at least one of adding, removing, modifying, or viewing items to be purchased.

6. The system of claim 1, wherein the web-based platform is configured to allow users to log-in or register with the web-based platform using the users existing social networking account.

7. The system of claim 1, wherein the web-based platform is configured to allow system administrators to place stylized images and text in the headers of web pages generated by the web-based platform.

8. The system of claim 1, wherein the web-based platform is configured to avow users to calculate shipping for an order and to track the progress of the shipment.

9. The system of claim 1 wherein the web-based platform further comprises a site installation for providing a unique site to each one of a plurality of customers, a plurality of product administrators, or a plurality of site administrators.

10. The system of claim 9 wherein the web-based platform generates a product-specific page which includes a display region for displaying information related to a product selected by the user, a history display region for displaying historical information about the product, a related items display region for displaying items related to the product, and a comment region for allowing the user to engage in live comment exchange.

11. A computer-implemented method for electronically sharing and purchasing memorabilia and merchandise comprising:
providing a web-based platform that displays a web-based user interface capable of allowing users to share and purchase memorabilia, the web-based platform including a platform server for storing and executing a platform engine and a content media database;
automatically generating a hashtag by the web-based platform relating to a piece of memorabilia or merchandise available on the web-based platform;
automatically transmitting the hashtag to a third-party social networking platform;
automatically retrieving, in real-time, a comment made by a user of the third-party social networking platform; and
integrating the comment into other comments moderated by the web-based platform.

12. The method of claim 11, further comprising the step of providing a timeline navigation module in the platform engine for generating an electronic timeline that allows a user to locate desired memorabilia or merchandise.

13. The method of claim 12, further comprising the step of generating the electronic timeline dynamically based on available merchandise or memorabilia such that the timeline generated is capable of expanding or contracting based on the number of years associated with the memorabilia or merchandise.

14. The method of claim 11, further comprising the step of providing an e-commerce platform for electronically processing purchases of memorabilia or merchandise selected using the web-based platform.

15. The method of claim 11, further comprising the step of providing a shopping cart module in the web-based platform for allowing users to perform at least one of adding, removing, modifying, or viewing items to be purchased.

16. The method of claim 11, further comprising the step of providing a social networking module in the web-based platform for allowing users to log-in or register with the web-based platform using the user's existing social networking account.

17. The method of claim 11, further comprising the step of providing a page headers module in the web-based platform for allowing system administrators to place stylized images and text in the headers of web pages generated by the web-based platform.

18. The method of claim 11, further comprising the step of providing a shipping module in the web-based platform which allows users to calculate shipping for an order and to track the progress of the shipment.

19. The method of claim 11, further comprising the step of providing a site installation on the web-based platform for providing a unique site to each one of a plurality of customers, a plurality of product administrators, or a plurality of site administrators.

20. The method of claim 19, further comprising the step of generating a product-specific page on the web-based platform which includes a display region for displaying information related to a product selected by the user, a history display region for displaying historical information about the product, a related items display region for displaying items related to the product, and a comment region for allowing the user to engage in live comment exchange.

21. A non-transitory computer-readable storage medium storing instructions, wherein execution of the instructions by the processing device causes the processing device to perform a method for electronically sharing and purchasing memorabilia and merchandise comprising:
providing a web-based platform that displays a web-based user interface capable of allowing users to share and purchase memorabilia, the web-based platform including a platform server for storing and executing a platform engine and a content media database;
automatically generating a hashtag by the web-based platform relating to a piece of memorabilia or merchandise available on the web-based platform;
automatically transmitting the hashtag to a third-party social networking platform;
automatically retrieving, in real-time, a comment made by a user of the third-party social networking platform; and
integrating the comment into other comments moderated by the web-based platform.

22. The computer-readable storage medium of claim 21, further comprising providing a timeline navigation module in the platform engine for generating an electronic timeline that allows a user to locate desired memorabilia or merchandise.

23. The computer-readable storage medium of claim 22, further comprising generating the electronic timeline dynamically based on available merchandise or memorabilia such that the timeline generated is capable of expanding or contracting based on the number of years associated with the memorabilia or merchandise.

24. The computer-readable storage medium of claim 21, further comprising providing an e-commerce platform for electronically processing purchases of memorabilia or merchandise selected using the web-based platform.

25. The computer-readable storage medium of claim 21, further comprising providing a shopping cart module in the web-based platform for allowing users to perform at least one of adding, removing, modifying, or viewing items to be purchased.

26. The computer-readable storage medium of claim 21, further comprising providing a social networking module in the web-based platform for allowing users to log-in or register with the web-based platform using the user's existing social networking account.

27. The computer-readable storage medium of claim 21, further comprising providing a page headers module in the web-based platform for allowing system administrators to place stylized images and text in the headers of web pages generated by the web-based platform.

28. The computer-readable storage medium of claim 21, further comprising providing a shipping module in the web-based platform which allows users to calculate shipping for an order and to track the progress of the shipment.

29. The computer-readable storage medium of claim 21, further comprising providing a site installation on the web-based platform for providing a unique site to each one of a plurality of customers, a plurality of product administrators, or a plurality of site administrators.

30. The computer-readable storage medium of claim 29, further comprising generating a product-specific page on the web-based platform which includes a display region for displaying information related to a product selected by the user, a history display region for displaying historical information about the product, a related items display region for displaying items related to the product, and a comment region for allowing the user to engage in live comment exchange.

* * * * *